April 19, 1960 S. N. JURICH 2,933,330
DEMOUNTABLE EQUALIZING SPRING SUPPORT MECHANISM FOR VEHICLES
Filed Oct. 16, 1958

INVENTOR.
Stevan N. Jurich
BY
ATTORNEYS

United States Patent Office 2,933,330
Patented Apr. 19, 1960

2,933,330
DEMOUNTABLE EQUALIZING SPRING SUPPORT MECHANISM FOR VEHICLES
Stevan N. Jurich, China Lake, Calif.
Application October 16, 1958, Serial No. 767,750
4 Claims. (Cl. 280—124)
(Granted under Title 35, U.S. Code (1952), sec. 266)

The invention described herein may be manufactured and used by or for the Government for governmental purposes without the payment of any royalty thereon.

The present invention relates to a truck load and body equalizing mechanism mounted between the outer end of the axle and the outer side walls of the body or load-carrying parts.

Load equalizers for trucks, trains and other heavy duty vehicles are well known in the art. However, most of these do not operate at places that need the most support, that is, the extremities of the load carrying platform. Further, many load equalizers are not adjustable to compensate for varying loads.

The object of this invention is to provide a demountable load equalizer for a truck or like vehicle which can be adjusted to compensate for the particular load to be hauled.

Numerous other objects and advantages of the invention will hereinafter become fully apparent from the following description of the drawings, illustrating a presently preferred embodiment thereof, and wherein.

Figure 1:
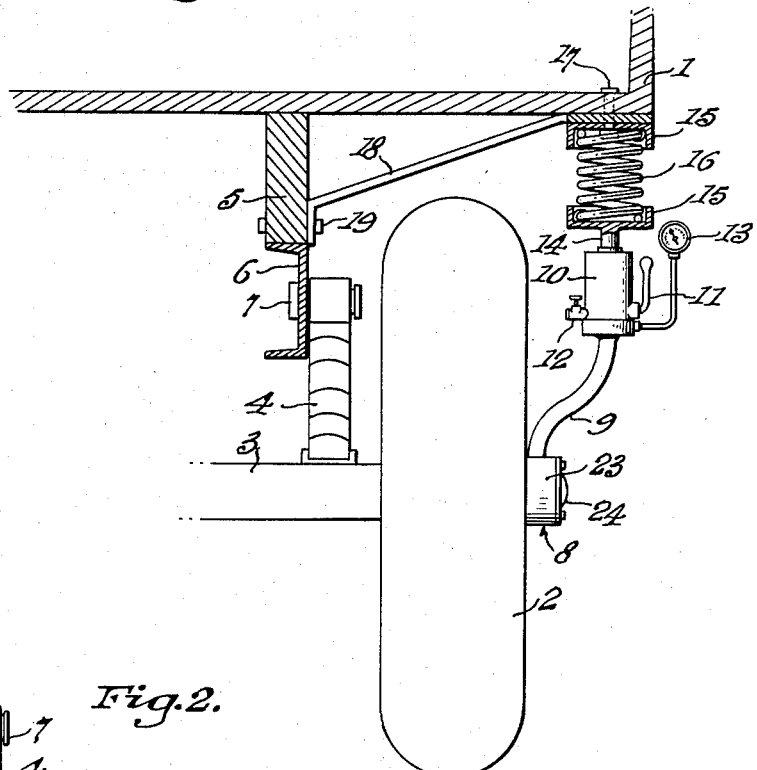
Fig. 1 is a fragmentary sectional view of a portion of a truck showing the invention applied thereto.
Figure 2:
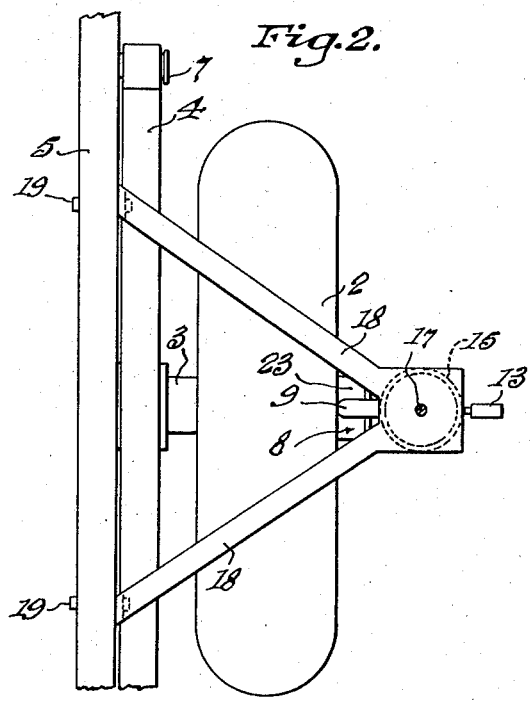
Fig. 2 is a plan view of a supporting bracket for the equalizing mechanism.

Referring now to the drawings with greater particularity, it is seen that in Figs. 1 and 2, showing a portion of a truck, the load carrying platform is designated as 1, while the wheel and axle housing are, respectively, 2 and 3. The leaf spring which provides the normal suspension means is 4, which is attached to the chassis frame 6 by means of leaf spring bolt 7. In turn, chassis frame 6 supports beam 5 of platform 1. At this point it will be apparent to those skilled in the art that only standard truck components have been described.

To the beam 5 is attached a V-shaped retaining bracket 18. The closed angle of this bracket 18 is bolted to the load carrying platform 1 adjacent the edge of the platform. The bolt 17 used to attach the bracket 18 to the platform 1 serves the additional function of a retaining bolt for the spring retaining cup 15. This circular cup seats a heavy duty coil spring 16 between it and a second similar cup also designated as 15. This second cup 15 is attached to a hydraulically actuated piston 14 which seats in a hydraulic pressure cylinder 10. The hydraulic piston is actuated by handle 11 to raise or lower the hydraulic piston 14 through an increase or decrease of pressure. The cylinder 10 has a release valve 12 for "bleeding" excess pressure. A gauge 13 is mounted at the side of cylinder 10 to indicate pressure readings. This gauge may be mounted in the cab of the truck (not shown) by use of appropriate extensions. The entire arrangement is supported by a gently curving support 9 which in turn is attached to bearing 23.

Figure 3:
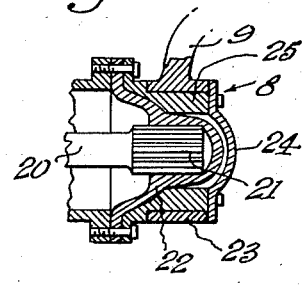
Fig. 3 is a detailed sectional view of the hub bearing.

Looking now with more particularity at Fig. 3, it is seen that 8 comprises the axle hub assembly. The bearing 25 coacts with bearing 23, thus allowing the bearing 23 in effect to remain in substantially fixed position with respect to the equalizing mechanism while the wheel turns. Lastly there is the hub cover 22 in which is keyed the axle hub 21, the terminal of axle 20. The axle hub assembly 8 has a removable plate 24 to facilitate removal of the entire mechanism.

To operate the load equalizing mechanism, the operator first loads the vehicle. Piston 14 is operated by use of handle 11 to obtain the desired pressure. By manipulating the "bleeder" valve 12 and the handle 11, he can verify the desired pressure at each position by reading gauge 13. To remove the wheel or change the tire, it is only necessary to remove the plate 24 and slide off the bearing 23 after releasing the pressure through valve 12.

It can be seen that the device can operate as an adjustable overload spring means as well as a load equalizer. The present invention allows a truck load and body equalizer to be mounted between the outer end of the axle and the outer sidewalls of the body or load carrying parts in such a way as not to interfere with the wheels.

Although there is herein shown and described only one form of equalizing mechanism embodying the present invention, it is to be understood that various changes and modifications may be made therein without departing from the spirit of the invention and the scope of the appended claims.

I claim:

1. In combination with a vehicle body and support means therefor including an axle mounting said support means, an axle hub assembly carried externally of said support means, a supplementary load equalizing mechanism including helical spring means and adjustable hydraulic lift means extending between the outer edge of the vehicle body and the axle hub assembly, upper and lower cup means for seating the ends of the spring means, bracket means for attaching the upper cup means to the vehicle body, the lower cup means being attached to said hydraulic lift means, a substantially vertically disposed offset bracket means terminating in a bearing member connecting the hydraulic lift means to the axle hub assembly, and bearing means forming a part of said axle hub assembly to permit rotation of said axle hub assembly relative to said vertically disposed bracket.

2. In a load equalizing mechanism as claimed in claim 1 wherein the hydraulic lift means comprise a cylinder, a piston for coaction with said cylinder, means for varying pressure within the cylinder, the piston being connected directly to the lower cup means, whereby action of the piston varies the tension on the spring means.

3. In a load equalizing mechanism as claimed in claim 2 wherein the axle hub assembly has a removable end plate to permit slipping off the bearing means, whereby the said equalizing mechanism is rendered removable.

4. In combination with a vehicle body and support means therefor, a supplementary load equalizing mechanism comprising retaining bracket means connected to the lower surface of the vehicle body and adjacent to an edge of the vehicle body extending beyond the support means, said retaining bracket terminating in a first cup portion, helical spring means adapted at one end to be received in said first cup portion, reciprocating hydraulic jack means including piston means terminating in a second cup means adapted to receive the other end of said spring means under compression, and cylinder means connected by off-set bracket means which terminates in sleeve bearing means connected to the external central hub portion of a supporting ground wheel, said hydraulic jack means containing thereon a pressure relief valve and a manually operated lever means for actuating said hydraulic jack means, and pressure indicating means to equally apportion load weight from various portions of the vehicle body directly to a supporting ground wheel.

References Cited in the file of this patent

UNITED STATES PATENTS 2,693,719    Johnson _____ Nov. 9, 1954